137-13

SEARCH ROOM

METHOD AND APPARATUS FOR LINEARIZING FLUID AMPLIFIER GAIN

Filed Nov. 23, 1964

2 Sheets-Sheet 1

INVENTOR
DONNIE R. JONES

BY Hurvitz & Rose

ATTORNEYS

Sept. 23, 1969 D. R. JONES 3,468,323

METHOD AND APPARATUS FOR LINEARIZING FLUID AMPLIFIER GAIN

Filed Nov. 23, 1964 2 Sheets-Sheet 2

INVENTOR
DONNIE R. JONES

BY Hurvitz & Rose

ATTORNEYS

United States Patent Office 3,468,323
Patented Sept. 23, 1969

3,468,323
METHOD AND APPARATUS FOR LINEARIZING FLUID AMPLIFIER GAIN

Donnie R. Jones, Silver Spring, Md., assignor to Bowles Engineering Corporation, Silver Spring, Md., a corporation of Maryland Filed Nov. 23, 1964, Ser. No. 413,267
Int. Cl. F17d *1/16;* F15c *1/10*
U.S. Cl. 137—13 19 Claims

ABSTRACT OF THE DISCLOSURE

A pure fluid amplifier having a linear characteristic and the method for linearizing such characteristic wherein positive feedback of power stream fluid is employed to modify power stream deflection so as to compensate for non-linearities in the velocity profile of the power stream.

This invention relates generally to pure fluid amplifiers, and particularly, to analog amplifiers utilizing positive feedback to maintain a constant or linear gain characteristic over a wide range of input signals.

Pure fluid amplifiers are amplifiers having no moving parts except the fluid itself. These amplifiers may be grouped into two broad categories; momentum or stream interaction amplifiers and boundary layer devices. The present invention is primarily concerned with the stream interaction or momentum interchange amplifier. In this type of amplifier, a power nozzle issues a stream of fluid into an interaction region or chamber. A control nozzle issues a control stream of fluid which impacts against and deflects the power stream away from the control nozzle. There is a conservation of momentums between the two streams and, therefore, the power stream is deflected at the point of impact from its original direction of flow through an angle which is a function of the momentum of the power stream and the momentum of the control stream. In this manner, a low energy control stream of fluid may be utilized to direct a high energy power stream of fluid toward or away from a target area or receiving aperture system, thus constituting amplification.

In an analog amplifier, the delivery of energy by a high energy power stream of fluid to an outlet orifice or utilization device is controlled by a low energy control flow of fluid. In many applications, it is desirable that the relationship between the output energy and the input control energy be linear over as wide a range of input control energy values as possible. The standard pressure ranges in industrial equipment, such as controllers, recorders, and indicataors require a linear output from 3 through 15 p.s.i. The known fluid amplifiers do not provide a linear output over this range. In the more usual case, the gain characteristic is linear over the upper end of the output pressure range while the gain characteristic over the lower end of the output pressure range is non-linear, usually concave downward.

It is an object of this invention to provide a pure fluid amplifier having a linear gain characteristic over a wide range of output pressures.

Another object of this invention is to provide a pure fluid amplifier utilizing positive feedback over only the lower range of output signals to provide a linear gain characteristic over a wide range of supply pressures.

Still another object of the present invention is to provide a pure fluid amplifier having a linear gain characteristic over a wide range of signals which amplifier may be employed as an inversion amplifier.

Yet another object of the present invention is to provide a pure fluid amplifier having a linear gain characteristic over an output signal range of at least 3 through 15 p.s.i A feature of this invention is a pure fluid amplifier including a power nozzle, control signal input means, output signal means, and an output passageway and an input control nozzle intercoupled to provide positive feedback that is effective over only the normally non-linear range of operation of the amplifier.

The above and still further objects, features and advantages of the present invention will become apparent upon consideration of the following detailed description of one specific embodiment thereof, especially when taken in conjunction with the accompanying drawings, wherein.

Figure 1:
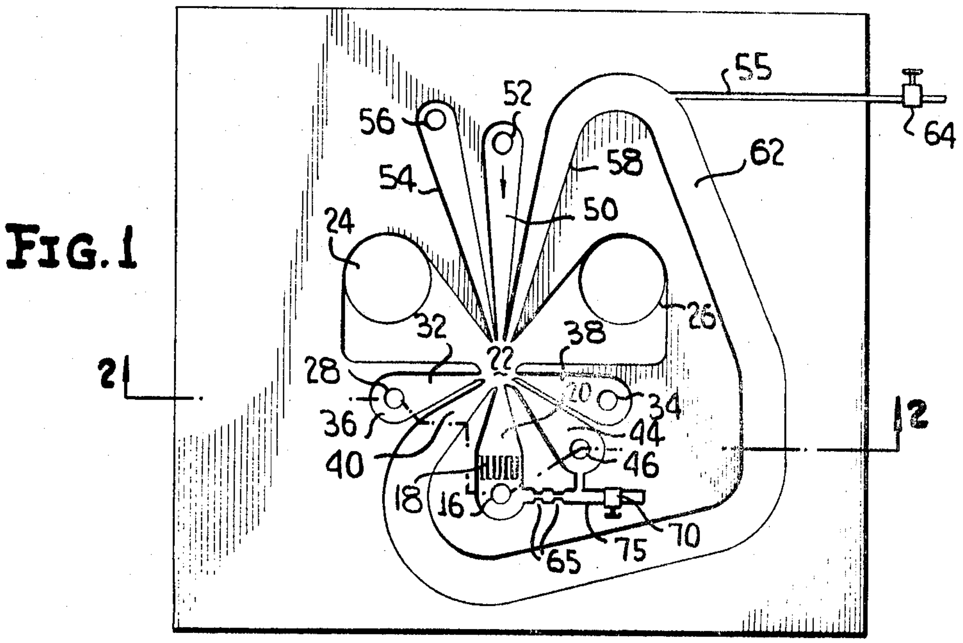
FIGURE 1 is a plan view of an embodiment of this invention.
Figure 2:
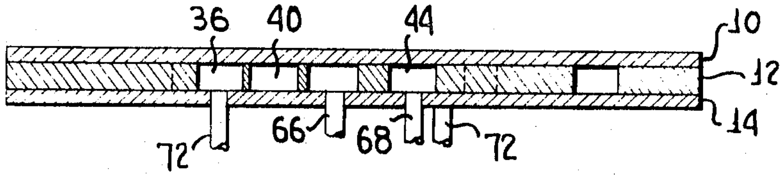
FIGURE 2 is an elevational view in section taken along line 2—2 of FIGURE 1.

Referring now to FIGURES 1 and 2 of the drawings, a pure fluid output analog amplifier is illustrated having a top plate 10, a middle plate 12 and a bottom plate 14 sandwiched together in a fluid-tight relationship by suitable means (not shown), such as machine screws or adhesive. The middle plate 12 is cut out to provide the working configuration of the amplifier which is shown in FIGURE 1. The middle plate may be eliminated with the cut-outs formed in one of the surfaces of plates 10 and 14 adjacent the other of the plates.

The amplifier has an input power aperture 16 coupled through a flow straightener 18 to an input power nozzle 20 which issues fluid into an interaction chamber 22. The interaction chamber 22 is laterally extended into a left vented recess 24 and a right vented recess 26 to insure that no boundary layer effects are established. A left input control aperture 28 enters into a left input control nozzle 32 which issues into the interaction chamber 22 on an axis which is preferably perpendicular to and intersecting with the prime axis of the power nozzle 20. A right input control aperture 34 enters into a right input control nozzle 38 which issues into the interaction chamber 22 on an axis which is preferably coaxial with (and opposed to) the axis of the left input control nozzle 32. A left feedback nozzle 40 is located between the left control nozzle 32 and the power jet nozzle 20, and issues into the interaction chamber 22 on an axis which is here shown at 60° to and intersecting with the axis of the power nozzle 20. For reasons to be explained subsequently, the throat of the nozzle 40 is wider than the throats of the other nozzles of the amplifier. A right bias nozzle 44, having an input aperture 46, is provided between the right control nozzle 38 and the power nozzle 20 and issues into the interaction chamber on an axis which is here shown at 60° to and intersecting with the axis of the power nozzle.

A central output passage 50, having an egress aperture 52, opens into the interaction chamber on an axis coaxial with the prime axis of the power nozzle 20. A left output passage 54, having an egress aperture 56, opens into the interaction chamber on an axis which is to the left of the prime axis of the power jet nozzle. A right output passage 58, connected through feedback channel 62 to feedback nozzle 40, opens into the interaction chamber on an axis which is radially to the right of the prime axis of the power nozzle 20.

The apertures 28, 34, 46, 52 and 56 extend from the middle plate 12 through the bottom plate 14. A feedback adjustment valve 64 is located in a passage 55 that extends between passage 62 and the atmosphere to regulate the flow of fluid from the right output passage 58 to the left feedback nozzle 40.

A first source of fluid under constant pressure (not shown) is coupled by a conduit 66 to the power nozzle aperture 16. If internal bias is to be employed, the nozzle 20 is connected through a passage 60 to the right bias nozzle 44. The passage 60 is provided with pressure dropping restrictors 65 to lower the pressure applied to the bias nozzle 44 to the desired region of operation of the bias nozzle. A bias adjustment valve 70 is provided in an extension 75 of the passage 60 to regulate the flow of fluid to the right bias nozzle 44. If external bias is employed, the bias signal may be coupled to bias nozzle 44 through a conduit 68 (see FIGURE 2). The valve 70 may be eliminated since bias flow may be regulated externally of the device. A source of control or signal fluid (not shown) is coupled by a conduit 72 to the right control input aperture 34. If a push-pull input signal is utilized, then the other output signal of the push-pull source of control fluid is coupled by a conduit 72 to the left control input aperture 28. However, for purposes of explanation, it is assumed there is a difference between the left and right control signals with a net positive signal at the right control nozzle 38. The central output aperture 52 communicates with the atmosphere or other suitable fluid dump. The left output aperture 56 is coupled to a suitable utilization device, such as a controller, pressure indicator, fluid device or recorder, etc. (not illustrated).

It may be noted that the power stream of fluid, when it arrives at the ingress orifices of the output passages, has a transverse pressure gradient. The center of the stream is at a maximum pressure, while the boundary regions of the stream, due to momentum interchange with the ambient fluid, is at a lesser pressure. The width of the orifices 54, 50 and 58 are here shown of such a size that each samples a small transverse portion of the power stream. If the power stream is axially centered on the orifice 54, maximum pressure is developed at the utilization device. If the power stream is not directed at the center of the orifice 54, then a lesser pressure is developed at the utilization device. If the power stream is not impinging on the orifice 54, then no significant pressure is developed at the utilization device. The fluid from the power and the control streams which does not pass into the orifices 54, 50 or 58 is diverted to the regions 24 and 26 and is dumped through fluid apertures 74 and 76 communicating with the atmosphere.

As previously stated, the normal control signal input in the apparatus illustrated in FIGURE 1 is to the right control nozzle 38 and the output signal is taken from the left output passage 54. Thus, there is a positive relation between the input and the output signals; that is, the greater the input signal or pressure from the nozzle 38, the greater the deflection of the power stream towards the left passage 54, and the greater the signal or pressure developed at the utilization device.

In operation, as the input signal from the right control nozzle 38 increases slightly from zero, the power jet is deflected towards the left, increasing the output signal developed in the left output orifice 54, and also decreasing the feedback signal developed in the right feedback passage 58, thus reducing the feedback signal issuing from the feedback nozzle 40. Thus, the power stream is deflected a greater distance from its original position than would be the case in the absence of the feedback flow. As the input signal is increased further, the feedback signal rapidly decreases, thereby providing a relatively high gain for low input control signals. When the input control signal is in the middle or high range, so that the power jet is directed predominantly towards the left output orifice 54, the feedback circuit provides substantially no feedback signal to the feedback nozzle 40, and the gain characteristic for the amplifier is the gain of the unit absent the feedback and bias signal circuits. In essence, the feedback and bias circuits are adjusted to provide an upward concave compensation of the gain characteristic at low input control signals, such that when added to the downward concave gain characteristic for low input control signals otherwise developed by the amplifier, the resulting gain characteristic for the amplifier for low input control signals is substantially flat or may be caused to assume some other desired characteristic. Since the gain characteristic of the amplifier for middle and high input control signals is already comparatively linear, the total result in the examples being described is an amplifier which has a substantially flat gain characteristic over a wide range of input control signal values.

Figure 3:
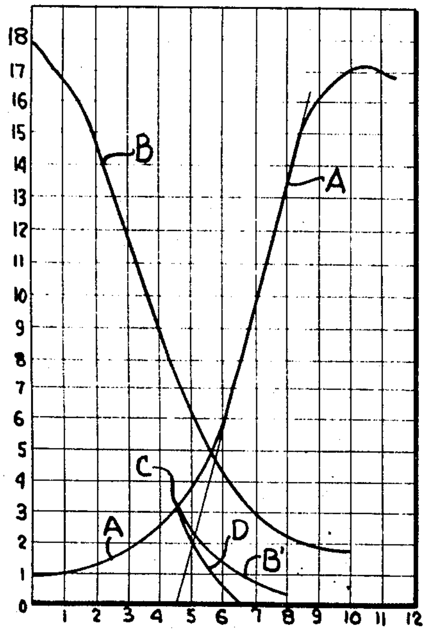
FIGURE 3 is a graph illustrating the output versus input pressure of the ampifier of FIGURES 1 and 2 without feedback and illustrating the correction required to obtain linear operation over an extended range.

Referring now specifically to FIGURE 3 of the accompanying drawings, the curve A is a plot of output signal pressure in the channel 54 versus input signal pressure to the nozzle 38, in the absence of feedback, with a bias initially supplied to the nozzle 32 such that the stream is initially approximately centered on the passage 58. Curve B is the output signal versus input signal of the passage 58 when the stream is initially biased to the passage 58 and is subsequently deflected by a signal applied to the nozzle 38, toward the output passage 54.

At any point, the gain of the device relative to passage 54 is the slope of the curve A. An input signal which varies from approximately 6.8 p.s.i.g. to 7 p.s.i.g. produces a change in output signal of 1 p.s.i. Thus, over this region the gain of the device is greater than 4. However, a change of input signal from 0 p.s.i.g. to 1 p.s.i.g. produces an output change of only .15 p.s.i.g. so that the gain at this point is equal to 0.15. It is readily apparent that the gain of such a device is nonlinear and this is to be expected. The reason that the gain is non-linear is that the input versus output curve is a plot of the velocity profile of the stream. At the very boundaries of the stream, when it reaches the ingress orifice to the output passages, the fluid is flowing at a velocity which is slightly greater than the ambient fluid. At the center of the stream, the fluid is flowing at maximum velocity. The slope of the curve, between maximum and minimum velocity points in the stream is not a straight line but is, in effect, a curve which rises gradually at first, thereafter rising rapidly through a center region of the stream over which region the curve is relatively flat and thereafter falls off.

If one considers that the deflection of the stream results in presenting different portions of the stream to an output passage and thus presents regions of the stream having different velocities to the output passage as determined by the velocity characteristic curve of the stream, then one must realize that the input-output function is a function of the velocity gradient curve or profile of the stream. In the example under consideration, this curve is a straight line; that is, has a constant slope, over a range of input signals from 5.8 to 7.9 p.s.i.g. Of more concern, so far as fluid amplifiers are concerned is the range of linearity of the output signal. In the case at hand, the range of linearity is from about 5.6 p.s.i.g. to 15 p.s.i.g. whereas it is desired to provide a device having a constant gain over 3 to 15 p.s.i.g. as an output signal.

Referring now to the curve B, it is apparent that the curve B is at a maximum at a zero input signal and falls off as the stream is deflected away from the passage 58. Thus, the curve B has a negative slope. By combining a portion of the operating range of the curve B of negative slope with a portion of the operating range of curve A of positive slope, it is possible to compensate to a certain extent for non-linearity of the curve A.

More particularly, if it is wished that the amplifier have a uniform gain over a range of output signals from 3 p.s.i.g. to 15 p.s.i.g., compensation of the curve A should be initiated when the output signal at the passage 54 is at 3 p.s.i.g. It is noted that, at an output signal of 3 p.s.i.g., the greatest compensation of the gain characteristic must occur, over the operating range under consideration, since the slope of the output-input curve at this point is a minimum. Further, as 5.4 p.s.i.g. output pressure is approached, the correction factor must be decreased since the non-linearity of the characteristic curve in this range is steadily decreasing The crossover of curves A and B is at the 3.75 p.s.i.g. output pressure wheras it is desired to have correction commence at the 3 p.s.i.g. output point More particularly, the output signal represented by curve B is too large to be employed directly to compensate for the non-linearity of the curve A Thus, the valve and passage arrangement 64 and 55 is provided to eliminate a portion of the signal applied to the output passage 58 from the feedback passage; in consequence, shifting the entire curve B downward so that it crosses curve A at a new point C at approximately 2.8 p.s.i.g. output pressure for the passage 54.

Figure 4:
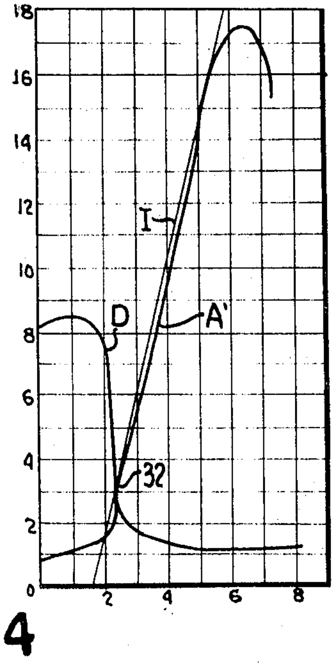
FIGURE 4 is a graph illustrating the output versus input pressure of the amplifiers of FIGURES 1 and 2 with feedback.

The gain compensation provided by such an arrangement is quite good. However, the slope of the feedback curve B in the range to the right of the curve A is not correct for complete compensation. The curve B of the feedback path must be corrected or an attempt made to correct the curve to have a slope as illustrated by the curve D. It will be noted that the curve D has a sharper slope than curve B and therefore the gain in the feedback path must be raised to provide for a steeper slope of the characteristic curve. This is accomplished in accordance with one form of the present invention by making the nozzle 40 wider than the remainder of the nozzles of the device. In simple terms, by enlarging the throat of this nozzle, the pressure drop across the nozzle is reduced and the pressure recovery from the feedback loop is raised. Thus, in any particular design by appropriately designing the throat of the nozzle 40 and adjusting the valve 64 for the proper amount of feedback, the curve B can be shifted so that it intersects the curve A at the point C and the gain or slope of the curve B can be altered to that approaching the curve D. It will be noted that the curve D goes through 0 at an input pressure of 5.8 p.s.i., at which the linear portion of the input-output curve begins. It will also be noted that the output curve for the passage 54 now commences at a signal level of 4.4 p.s.i.g. and theoretically no output signal is produced by any input signal up to 4.4 p.s.i. As a practical matter, this is not true; and the entire set of curves of FIGURE 3 now appear as the curves of FIGURE 4. In FIGURE 4, curve A is the plot of the output versus input function of the passage 54. The curve D is an input versus output function of the feedback path. It must be remembered that the feedback path function is different from the output function of the passage 58 due to the operation of the valve 64 and the design of the nozzle 40. The curve I of FIGURE 4 is the ideal output-input curve; that is, a curve in which the output versus input function is a perfectly straight line. It will be noted now that the curve D has been materially altered relative to the output function of the passage 58. More particularly, the maximum signal has been greatly reduced, the slope of the curve is much sharper than that of the curve in FIGURE 3 and, as a result, the feedback falls to a minimum far more rapidly than the curve B of FIGURE 3. The curve A of FIGURE 4; that is, the output versus input curve for the passage 54 is now much more nearly a straight line over an operating range from 3.2 p.s.i. to 16 p.s.i.g. In actuality, the gain characteristic is about 3.5 plus or minus 3 percent over the range of 3.2 to 16 p.s.i.g. The power stream nozzle was at 30 p.s.i.g.; the control nozzle was .02″ x .04″; the egress orifice of the feedback nozzle was .03″ x .04″; and a load was simulated by means of a constriction in the passage 54 of .02″ x .04″.

While the embodiment shown here is a pressure amplifier, the invention may also be utilized in mass-flow and power amplifiers by appropriately proportioning the ingress orifices to the output passages. Also, it should be noted that bias of the power stream may be developed by employing a boundary layer wall along the left side of the device. The location of the wall would be such as to only partially deflect the power stream to the left; the deflection being insufficient in the absence of a control signal to divert the stream from the feedback passage 58. Thus, the bias developed by the wall, under initial conditions, will be opposed by feedback flow to establish a desired equilibrium position of the stream. The arrangement illustrated has the advantage that the bias flow may be adjusted to vary the initial level of positive feedback and thus tailor this function to the characteristics of each particular device or the operating characteristics as determined by the pressure of the power stream.

Figures 5, 6:
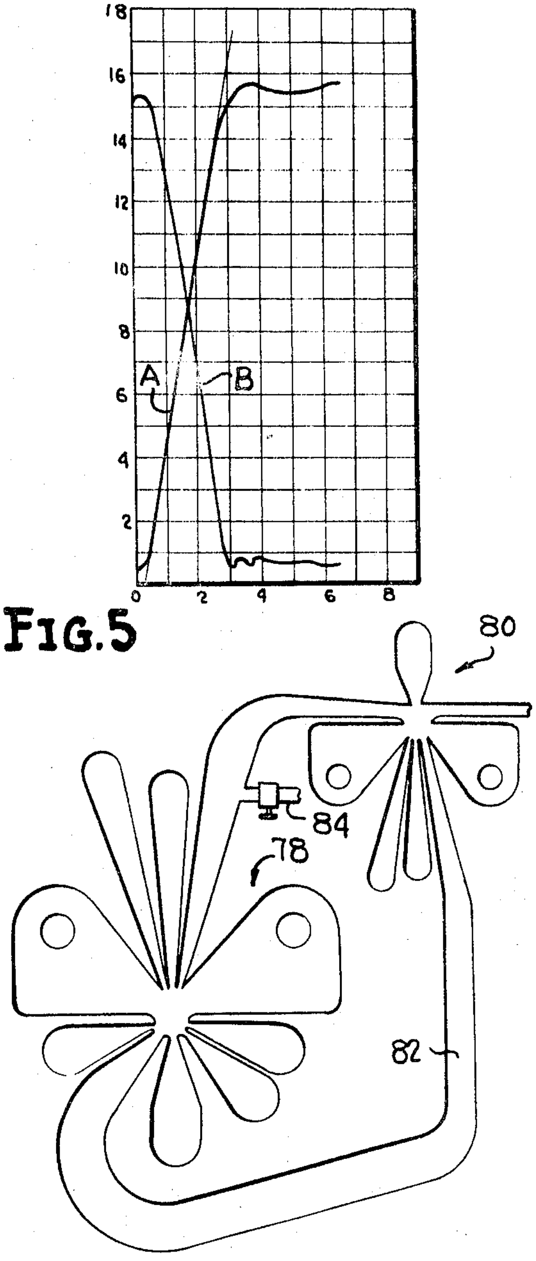
FIGURE 5 is a graph of the output versus input pressure of the amplifiers of FIGURES 1 and 2 illustrating the direct and inverse output functions.
FIGURE 6 is a diagram illustrating a second embodiment of the present invention.

As previously indicated, it is desired to provide a pure fluid signal converter, such a device having many applications in control devices whether they be pure fluid or electronic or mechanical systems. It is apparent that, in order to provide an inversion function, it is essential that the gain of the amplifier be a constant over the operating range of the device so that a non-linear function between input and output is not developed as a result of the operation of the amplifier per se. In order to provide an inverter amplifier, the apparatus of FIGURE 1 is employed with a sufficient bias applied to the nozzle 32 that the power stream is initially centered on the passage 58. Actually, as will be seen, reference now being made to FIGURE 5, the power stream is initially displaced somewhat to the right of the ingress orifice of the passage 58 as viewed in FIGURE 1 so that the pressure in the passage 58 is not a maximum. In FIGURE 5, the curve A is the function at the output passage 54 and the curve B is the function at the output passage 58. It will be seen that the curve B is substantially a true inverse of the curve A. Thus, the output signal taken from the passage 58 is an inversion of the output signal which would normally be derived from the passage 54.

Figure 7:
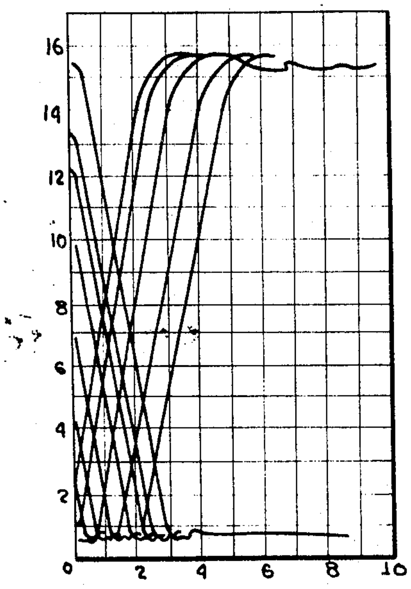
FIGURE 7 is a graph illustrating a series of output versus input pressure curves of the circuit of FIGURE 6.

Referring now specifically to FIGURE 6 of the accompanying drawings, there is illustrated a second embodiment of the present invention in which a second fluid amplifier is inserted in the feedback path from the output to the input of the first amplifier. In this figure, the first amplifier is designated by the reference number 78 and the amplifier and feedback channels designated by reference numerals 80 and 82, respectively. It will be noted that the amplifier 80 is identical in all respects with the amplifier 78 except that the amplifier 80 is smaller and is designed therefore to operate on a lower pressure to the power nozzle. The reason for this is that, since the feedback channel 82 is supplied from an output passage of the amplifier 80, the pressure in this passage must coincide with the curve as illustrated by curve D in FIGURE 4. Thus, the maximum output pressure from the amplifier 80 must be approximately 7.9 p.s.i.g. rather than about 17 or 18 p.s.i.g. as in the unit 78. One of the primary reasons for using an amplifier 80 in the feedback loop is that it provides greater ability to shape the feedback curve than is possible with the apparatus of FIGURE 1; that is, where a separate amplifier is not employed. It is apparent that the overall design of the amplifier and that choice of various bias signals on various nozzles provides a far greater degree of control of the shape of the curve than is possible with just the valve 64 and nozzle 40 of the apparatus of FIGURE 1. FIGURE 7 illustrates a series of curves of forward and inverse output pressure curves produced by the apparatus of FIGURE 6 employing various biases in the main stage.

A set of curves such as FIGURE 7 may be developed for each different output load so that a complete set of characteristics of the device may be provided.

What I claim is:

1. A fluid amplifier for providing an output signal which has a substantially linear gain characteristic with respect to a wide range of input control signals, comprising:

a fluid amplifier for issuing a main stream of fluid;
control input means for issuing control signals for deflecting the main stream of fluid;
a positive fluid feedback path for feeding back a portion of said main stream into said amplifier in opposition to said control signals, means for applying a bias signal in opposition to said feedback signal such that fluid passing through said feedback path has a maximum effect in the absence of a significant control signal, a progressively lesser effect in the presence of a progressively larger control signal, and substantially no effect in the presence of control signals of the middle and high range.

2. A fluid amplifier for providing an output signal which has a substantially linear gain characteristic with respect to a wide range of input control signals, comprising:

a fluid amplifier for issuing a main stream of fluid;
control input means for issuing a wide range of control signals for deflecting the main stream of fluid;
a fluid feedback path having an opening for receiving and feeding back a porton of said main stream into said amplifier for deflecting of said main stream in opposition to said control input means, a bias means for deflecting said main stream in opposition to said feedback fluid to establish an initial feedback flow of a specific magnitude, said opening of said feedback path being arranged to receive fluid from said stream such that said feedback path has a maximum effect in the absence of a significant control signal, a progressively lesser effect in the presence of a progressively larger control signal, and substantially no effect in the presence of control signals of the middle and high range.

3. A fluid amplifier having a substantially constant gain characteristic with respect to a wide range of input control signal pressures, comprising:

an interaction chamber;
a power nozzle for issuing a power stream of fluid into said interaction chamber;
an output signal orifice capable of receiving at least a portion of said fluid of said power stream;
a feedback signal orifice for receiving over a limited range of deflection of said power stream at least a portion of said fluid of said power stream;
a control jet nozzle for issuing a control flow of fluid into said interaction chamber, which flow may have any pressure in a wide range of pressures, for deflecting the power stream towards said output signal orifice;
a feedback nozzle in fluid flow communication with said feedack signal orifice to provide a path for issuing received fluid into said interaction chamber for deflecting said power stream, which deflection is in opposition to the deflection caused by the control jet, said feedback signal orifice being positioned such as to have a maximum effect in the absence of a significant control signal, a progressively lesser effect in the presence of a progressively larger control signal, and substantially no effect in the presence of control signals of the middle and high range.

4. A fluid amplifier for providing an output signal pressure which has a substantially linear gain characteristic with respect to a wide range of input control signal pressures, comprising:

an interaction chamber;
a power nozzle for issuing a power stream of fluid into said interaction chamber;
an output signal orifice for receiving at least a portion of the fluid of the power stream;
a feedback signal orifice for receiving over a limited range of deflection of the power stream at least a portion of the fluid of the power stream;
a control nozzle for issuing a control flow of fluid into said interaction chamber, which control flow may have any pressure in a wide range of pressures, for deflecting the power stream towards said output signal orifice;
a feedback nozzle in fluid flow communication with said feedback signal orifice for issuing received fluid into said interaction chamber for deflecting the power stream, which deflection is in opposition to the deflection caused by the control flow, so that more fluid flows into said feedback signal orifice, said feedback nozzle receiving a maximum flow of fluid in the absence of a significant control signal, a progressively lesser flow of fluid in the presence of a progressively larger control signal, and substantially no flow of fluid in the presence of control signals of the middle and high range.

5. A fluid amplifier for providing an output signal pressure which has a substantially linear gain characteristic with respect to a wide range of input control signal pressures, comprising:

an interaction chamber;
a power nozzle for issuing a power stream of fluid into said interaction chamber;
a feedback signal orifice for receiving over only a limited range of deflection of said power stream at least a portion of the fluid of the power stream;
a feedback nozzle in fluid flow communication with said feedback signal orifice for issuing received fluid into said interaction chamber for deflecting the power stream so that more fluid flows into said feedback signal orifice for greater deflection of the power stream;
an output signal orifice for receiving at least a portion of said fluid of said stream;
a control passage for issuing a control jet of fluid into said interaction chamber, which cotnrol passage may issue fluid at any pressure over a wide range of pressures, for deflecting the power stream towards said output signal orifice, which deflection is in opposition to the deflection caused by the feedback fluid;
said nozzles and orifices being so constructed and arranged that said feedback orifice and nozzle receive a maximum flow of fluid in the absence of a significant flow of fluid from said control nozzle, a progressively lesser flow of fluid in the presence of a progressively greater flow of fluid from said control nozzle, and substantially no flow of fluid in the presence of flows of fluid of the middle and high range from said control nozzle.

6. A fluid amplifier for providing an output signal pressure which has a substantially linear gain characteristic with respect to a wide range of input control signal pressures, comprising:

an interaction chamber;
a power nozzle for issuing a power stream of fluid into said interaction chamber;
dump means for receiving at least a portion of the fluid of the power stream;
a feedback signal orifice for receiving over only a limited range of deflection of said power stream at least a portion of the fluid of the power jet, disposed to one side of said dump means;
an output signal orifice for receiving at least a portion of the fluid of the power stream, disposed to the other side of the said dump means;
a feedback nozzle in fluid flow communication with said feedback signal orifice for issuing received fluid into said interaction chamber for deflecting the power stream towards said feedback orifice so that more fluid flows into said feedback orifice for greater deflection of the power jet;

a control jet nozzle for issuing a control flow of fluid into said interaction chamber, which control flow may have any pressure in a wide range of pressures, for deflecting the power stream towards said output signal orifice, which deflection is in opposition to the deflection caused by the feedback fluid;

said nozzles and orifices being so constructed and arranged that said feedback orifice and nozzle receive maximum flow of fluid in the absence of a significant flow of fluid from said control nozzle, a progressively lesser flow of fluid in the presence of a progressively greater flow of fluid from said control nozzle, and substantially no flow of fluid in the presence of flows of fluid of the middle and high range from said control nozzle.

7. A fluid amplifier for providing an output signal pressure which has a substantially linear gain characteristic with respect to a wide range of input control signal pressures, comprising:

an interaction chamber;

a power nozzle for issuing a power stream of fluid along with a prime axis into said interaction chamber;

a dump orifice for receiving at least a portion of the fluid of the power jet, disposed substantially opposite to said power nozzle and coaxial with said prime axis;

a feedback signal orifice for receiving over any limited range of deflection of said power stream at least a portion of the fluid of the power stream, disposed generally opposite to said power nozzle and to one side of said prime axis;

an output signal orifice for receiving at least a portion of the fluid of the power stream, disposed generally opposite to said power nozzle and to the other side of said prime axis;

a feedback jet nozzle in fluid flow communication with said feedback signal orifice, disposed adjacent and at said other side of said power nozzle, for issuing received fluid into impingement with the power stream for deflecting the power stream towards said feedback orifice so that more fluid flows into said feedback orifice stream;

a bias nozzle disposed adjacent and at said one side of said power nozzle for issuing a constant flow of fluid into impingement with the power stream for deflecting the power stream towards said other side of said axis;

a control nozzle disposed adjacent and at said one side of said power nozzle for issuing a control flow of fluid into impingement with the power stream for deflecting the power stream towards said output signal orifice, control flow may have any pressure in a wide range of pressures;

said nozzles and orifices being so constructed and arranged that said feedback orifice and nozzle receive a maximum flow of fluid in the absence of a significant flow of fluid from said control nozzle, a progressively lesser flow of fluid from the presence of a progressively greater flow of fluid from said control nozzle, and substantially no flow of fluid in the presence of flows of fluid of the middle and high range from said control nozzle.

8. The fluid amplifier according to claim 7 wherein said feedback jet nozzle has a throat of wider cross-section than the throat of said control nozzle.

9. The fluid amplifier according to claim 8 wherein said control nozzle is disposed on an axis substantially perpendicular to the axis of said power nozzle, and said feedback jet nozzle and said bias nozzle are disposed on respective axes which intersect the axis of said power nozzle at an angle of substantially 60°.

10. A method of linearizing the gain characteristic of an analog amplifier having a non-linear gain characteristic over low range of input signals and a linear characteristic over a high range of input signals comprising:

providing positive feedback from the power jet as a control signal in opposition to the input control signal which feedback control signal is a maximum when the input control signal is a minimum, and reducing the gain of the feedback signal as the input control signal increases so that the feedback becomes ineffective when the input control signals are in said high range, so that the algebraic sum of the gain of the amplifier without the feedback and the gain resulting from the feedback is a constant over both said low and high ranges of input signals.

11. A fluid system employing a fluid amplifier having means for issuing a power stream of fluid, control means for issuing input signals variable over a range of control flows against said power stream and further means for issuing a flow of fluid against said power stream in opposition to said control flow, said fluid amplifier having a gain characteristic which is non-linear over a lower range of control flows and is linear over a higher range of control flows, said fluid system comprising:

a positive feedback path receiving and supplying a portion of said power stream to said further means to increase the portion of said power stream supplied to said feedback path;

said feedback path being positioned relative to the means for issuing said power stream of fluid such that flow thereto is substantially discontinued when the control signal magnitude attains the lower limit of the range of control flows over which said amplifier gain characteristic is linear.

12. A fluid amplifier having a substantially linear output signal versus input signal characteristic comprising:

a power nozzle for issuing a power stream of fluid having a predetermined and at least partially nonlinear pressure gradient at a predetermined location downstream of said power nozzle;

output passage means positioned at said predetermined location for receiving selectable portions of said power stream;

control means for deflecting said power stream with respect to said output passage means as a proportional function of said input signal;

means responsive to power stream deflection for varying the amount of power stream deflection produced by said control means only when said output passage means receives portions of said power stream corresponding to the non-linear parts of said pressure gradient.

13. A pure fluid amplifier having a substantially linear output signal versus input signal characteristic comprising:

a power nozzle for issuing a power stream of fluid;

output passage means for receiving portions of said power stream and providing said output signal therefrom, the upstream end of said output passage means being positioned downstream of said power nozzle at a location where said power stream has a transverse pressure gradient including at least one nonlinear portion;

control means for selectively deflecting said power stream toward said output passage means in proportion to said input signal;

feedback means for changing the amount of power stream deflection produced by said control means only when said output passage means receives portions of said power stream corresponding to the nonlinear portion of said pressure gradient.

14. The pure fluid amplifier according to claim 13 wherein said feedback means comprises a fluid feedback passage disposed to receive portions of said power stream, a feedback nozzle for issuing fluid received by said fluid feedback passage into interacting relation with said power stream, and adjustable means for venting a predetermined portion of the fluid received by said fluid feedback passage.

15. The pure fluid amplifier according to claim 14 further comprising a vent passage disposed between said output passage means and said fluid feedback passage, said vent passage being substantially coaxial with the undeflected power stream.

16. The pure fluid amplifier according to claim 15 wherein the non-linear portion of said pressure gradient is at the transverse extremity of said power stream, said amplifier further comprising bias means for deflecting said power stream such that in the absence of an input signal said power stream is centered slightly to the side of said fluid feedback passage remote from said output passage means, and means for conducting a further output signal from said feedback passage, said further output signal comprising a linear inverse function of said input signal.

17. The pure fluid amplifier according to claim 16 wherein said control means includes a control nozzle disposed on the opposite side of said power stream from said feedback nozzle, said feedback nozzle having a substantially wider throat cross-section than said control nozzle.

18. The pure fluid amplifier according to claim 15 wherein the non-linear portion of said pressure gradient is located at the transverse extremity of the power stream, said amplifier further comprising bias means for deflecting said power stream such that in the absence of an input signal said power stream is centered on said feedback fluid passage, whereby as said input signal increases, the amount of fluid received by said fluid feedback passage decreases.

19. The pure fluid amplifier according to claim 18 wherein said control means includes a control nozzle for issuing said input signal as a control stream substantially perpendicular to said power stream, said feedback nozzle being disposed on the opposite side of said power stream from said control nozzle and having a wider throat cross-section that said control nozzle.

References Cited

UNITED STATES PATENTS

| | | | |
|---|---|---|---|
| 3,001,539 | 9/1961 | Hurvitz | 137—81.5 |
| 3,024,805 | 3/1962 | Horton | 137—81.5 |
| 3,158,166 | 11/1964 | Warren | 137—81.5 |
| 3,275,013 | 9/1966 | Colston | 137—81.5 |

FOREIGN PATENTS 1,278,781 11/1961 France.

OTHER REFERENCES

Mitchell A. E.: Fluid oscillator, I.B.M. Techniqual Disclosure Bulletin, vol. 5, No. 6, November 1962.

M. CARY NELSON, Primary Examiner

W. R. CLINE, Assistant Examiner

U.S. Cl. X.R.

137—81.5